United States Patent [19]

Trilling

[11] 3,895,182

[45] July 15, 1975

[54] MULTI-CHANNEL SENSOR SYSTEM

[76] Inventor: Ted R. Trilling, R.D. No. 4, Berkshire Rd., Doylestown, Pa. 18901

[22] Filed: Dec. 20, 1973

[21] Appl. No.: 426,870

[52] U.S. Cl. .............................. 178/6.8; 178/DIG. 8

[51] Int. Cl.$^2$ .............................. H04N 7/18

[58] Field of Search .............. 178/6, 7.6, DIG. 8, 6.8

[56] References Cited

UNITED STATES PATENTS

| | | | |
|---|---|---|---|
| 3,635,085 | 1/1972 | Shimotsuma | 178/DIG. 8 |
| 3,723,642 | 3/1973 | Laakmann | 178/7.6 |
| 3,798,366 | 3/1974 | Hunt | 178/7.6 |
| 3,804,976 | 4/1974 | Gard | 178/7.6 |
| 3,827,075 | 7/1974 | Baycura | 178/7.6 |
| 3,829,192 | 7/1974 | Wheeler | 178/7.6 |

OTHER PUBLICATIONS

Gerritsen, et al., "An Infrared Image Converter . . . " IEEE Transactions on Electron Devices, Vol. ED-18, No. 11, Nov. 71, pp. 1011-1015.

*Primary Examiner*—Howard W. Britton
*Assistant Examiner*—Michael A. Masinick
*Attorney, Agent, or Firm*—R. S. Sciascia; Henry Hansen

[57] ABSTRACT

A multi-channel infrared sensor system having digital normalization of the gains and levels of the individual channels and for providing an analog video output which is television compatible without requiring data storage. A scanning system perpendicularly scans across an infrared detector array wherein each detector supplies information to one of *n* channels thereby producing a scan image consisting of *n* lines. A reference cavity containing dual infrared reference sources is scanned periodically such that each detector views each of the reference sources once per line. An eight bit A/D converter converts the analog output of each detector channel to a digital format and a multi-channel parallel processor separately processes each channel output by normalizing the output of each detector to the reference sources thereby normalizing all channels to each other. A sampler samples the output of the multi-channel processor and produces a multiplexed single channel digital output containing *n* eight bit words per television compatible line. A D/A converter converts the digital single channel output of the parallel processor into an analog form suitable for viewing on a television display.

10 Claims, 7 Drawing Figures

MULTI-CHANNEL SENSOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to multi-channel infrared sensor systems and particularly to apparatus wherein each of the channels within the system are normalized in both level and gain to each other and the output signal is television compatible without the use of data storage.

A typical example of a multi-channel sensor system is a forward looking infrared (FLIR) device. In present FLIR systems the image must be reconstructed from system channels by using an identical scanning system with light emitting diodes connected to the output of each channel to reproduce a picture which is viewed directly with a vidicon in order to generate a television compatible picture. Alternatively, each of the system channels must be time sampled in order to form a continuous single channel signal which is then used to make up a non-television compatible picture.

SUMMARY OF THE INVENTION

Accordingly, it is an object of the present invention to provide a multi-channel infrared sensor system wherein the gains and levels of all channels will be automatically normalized. Another object is to provide for digital signal processing and direct conversion to television format without the use of scan converters which require storage apparatus. Yet another object of the present invention is to provide dc coupling within the sensor system in order to obviate defects that occur with ac coupled systems.

Briefly, these and other objects are accomplished by an $n$ channel infrared sensor system wherein a scanning system perpendicularly scans across an infrared detector array having each detector output assigned to an individual information channel for producing an image consisting of $n$ lines. A reference cavity containing dual infrared reference sources is scanned periodically such that each detector views each of the reference sources once per scan line. An eight bit A/D converter converts the analog output of each detector to a digital format. A multi-channel parallel processor separately processes each channel output and normalizes the output signal to the reference sources, thereby normalizing all channels to each other. A sampler samples the output of the multi-channel processor and produces a single multiplexed channel output containing $n$ eight bit words per television compatible line. A D/A converter converts the digital single channel signal into an analog output suitable for viewing on a television display.

For a better understanding of these and other aspects of the invention, reference may be made to the following detailed description taken in conjunction with the accompanying drawings.

DESCRIPTION OF THE PREFERRED EMBODIMENT

Figure 1:
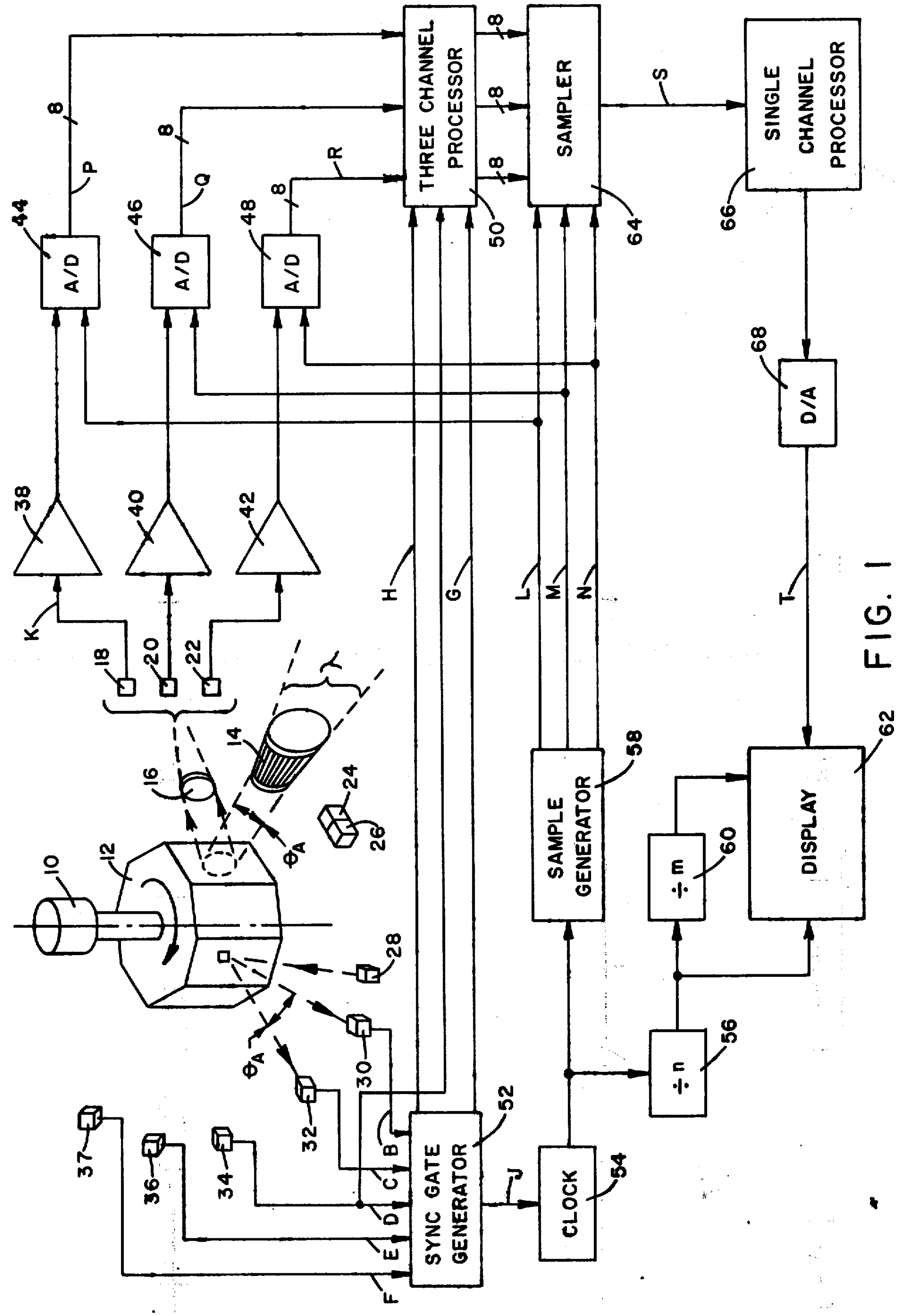
FIG. 1 is a schematic and block diagram of a three channel infrared sensor system as used in the present invention.

Referring now to FIG. 1 there is shown a schematic and block diagram of a multi-channel infrared sensor system as used within the present invention. For the sake of simplicity and ease of understanding, a value of $n = 3$ is chosen and only a three channel system is shown. Obviously, additional channels may be added if desired. It should be noted that a typical infrared system will generally contain 200 to 600 channels, particularly if the FLIR system is conventional television compatible. An infrared scanning system consists of a motor 10 whose output shaft rotatably turns an eight sided mirror 12 about a common axis. Incoming radiation $\lambda$ is viewed by a telescopic lens 14 which focuses the radiation on one side of the mirror 12 over an angle $\theta_A$. The radiation $\lambda$ is reflected from the mirror side and converged by a second lens 16 on an array of infrared detectors 18, 20, 22. The detectors 18, 20, 22 are arranged in a linear arrangement parallel with the rotational axis of the mirror. Accordingly, as the mirror 12 rotates, the incoming radiation $\lambda$ is scanned perpendicular to the detectors 18, 20, 22. Thus with the full rotation of one side of the mirror 12 across the lens 14, a corresponding scan of the radiation $\lambda$ is swept across the detectors 18, 20, 22. Located adjacent to the lens 14 and following the rotation of the mirror 12 is a conventional reference cavity containing two infrared reference sources 24, 26. Each reference source 24, 26 may contain, for example, a source of thermoelectrically generated infrared radiation which is carefully controlled. Thus as the mirror 12 begins to rotate it will sequentially reflect the incoming radiation $\lambda$ and each of the reference sources 24 and 26 in turn. A light emitting diode 28 and photo cells 30, 32, 34, 36, 37 are positioned coaxially about the rotating mirror 12 in order to provide timing signals for the sensor system. The diode 28 projects a light source on one of the mirror sides which is not being concurrently used for infrared scanning. In the illustration, the diode light reflective surface is displaced two mirror sides from the reflecting side used for incoming radiation. Photocells 30, 32 are carefully positioned such that when the detectors 18, 20, 22 receive infrared radiation at the beginning of a line scan photocell 30 receives a reflected light pulse from the diode 28 and when detectors 18, 20, 22 have received the end of the infrared radiation line scan, photocell 32 receives a reflected light pulse from diode 28. Similarly, as the mirror side sequentially rotates from the incoming radiation $\lambda$ to each of the reference sources 24, 26, photocells 34 and 36 are respectively activated by reflected light from the diode 28. Photocell 37 is positioned to receive a reflected light pulse from diode 28 once for each rotation of a side of the mirror 12. Thus there is provided an infrared scanning system which sequentially scans a field of incoming radiation and each of two infrared reference sources, the reflected images of which are perpendicularly scanned across an array of infrared detectors 18, 20, 22. There is also provided a series of timing pulses corresponding to the angular position of the scanning mirror 12.

Each of the detectors 18, 20, 22, have an output connected to respective inputs of amplifiers 38, 40, 42 whose outputs are each respectively connected to first inputs of A/D converters 44, 46, 48. Each of the outputs of the A/D converters 44, 46, 48 representing eight bits of binary data parallelly connected to first, second, and third inputs of a three channel processor 50. Each of the photocells 30, 32, 34, 36, 37 have outputs connected to inputs of a sync gate generator 52 which provides first and second output timing signals connected to fourth and fifth inputs of the three channel processor 50. A clock 54 is connected to receive a third timing output signal from the generator 52 and provides an output commonly connected to the input of a first divider 56 and the input of a sample generator 58. The output of the first divider is commonly connected to the input of a second divider 60 and a first input of a display 62. The output of the second divider 60 is connected to a second input of the display 62. The generator 58 produces first, second and third outputs which are commonly connected to respective second inputs of A/D converters 44, 46, 48 and to first, second and third inputs of a sampler 64. The sampler 64 is connected to receive three eight bit digital outputs from the processor 50 and has a single output connected to the input of a single channel processor 66. The output of the processor 66 is connected to the input of a D/A converter 68 whose output is connected to a third input of the display 62.

Figure 2:
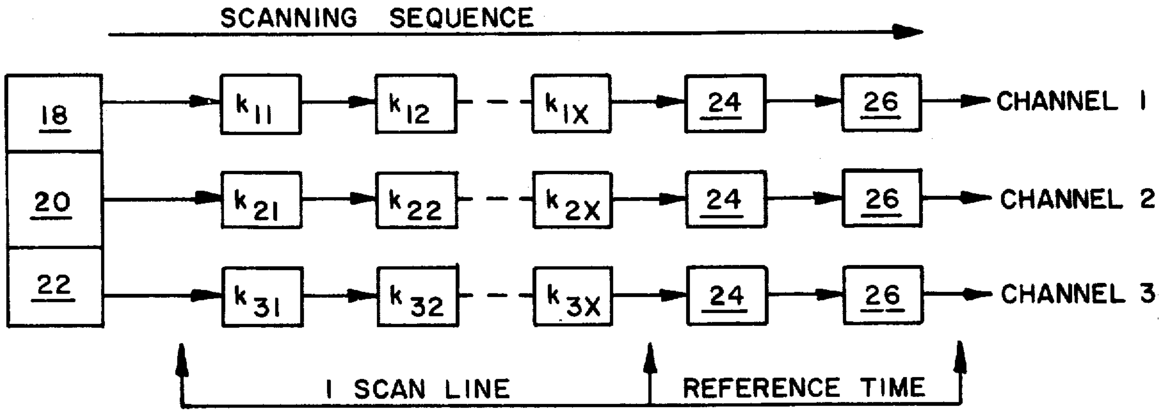
FIG. 2 is a diagram of the scanning sequence used within the invention shown in FIG. 1.

Referring again to FIG. 1 in conjunction with FIG. 2, the operation of the scanning system as it effects the array detectors 18, 20, 22 will now be explained. Incoming infrared radiation λ enters the scanning system through the lens 14 and is reflected by the converging lens 16 onto the array detectors 18, 20, 22. By rotation of the mirror 12, the radiation λ is perpendicularly scanned across the detectors. The area to be scanned by any one of the detectors is determined by the fixed position of the detector in relation to the rotating mirror 12 and the lenses 14, 16. Accordingly, the area to be scanned by any one detector is partitioned into a series of resolution elements $k$. For example, detector 18 begins the scanning sequence by first scanning $k_{11}$ and continuing to scan to the last resolution element $k_{1,r}$. The subscripts attached to each of the resolution elements designate the row position by the first digit and the column position by the second digit. Similarly, detector 20 scans resolution elements $k_{21}$ through to $k_{2,r}$. An image of the entire area scanned by the detectors can be constructed from the series of resolution elements scanned by each detector within the array. Thus, one line of the scanned image consists of all the resolution elements scanned by any one detector. Therefore, the composite scan image will consist of $n$ scan lines with $k$ resolution elements per line wherein $n$ represents the number of detectors within the array and therefore the number of channels within the sensor system. At the end of every scan line, each detector views both of the reference sources 24, 26 one at a time. Accordingly, detector 18, after scanning resolution element $k_{1,r}$, goes on to view reference source 24 and later reference source 26. Therefore, one complete channel of infrared information consists of the information contained within all of the resolution elements associated with that channel plus the additional information gained by viewing both the reference sources 24, 26. Accordingly, FIG. 2 illustrates a scanning sequence which provides channel information for channels 1, 2 and 3. If desired, interlace may be used in the sensor system by permitting additional scanning in a direction parallel to the detectors 18, 20, 22. In this latter case, the reference sources 24, 26 will be viewed once per field and more than once per frame depending upon the amount of interlace desired.

Figure 3A:
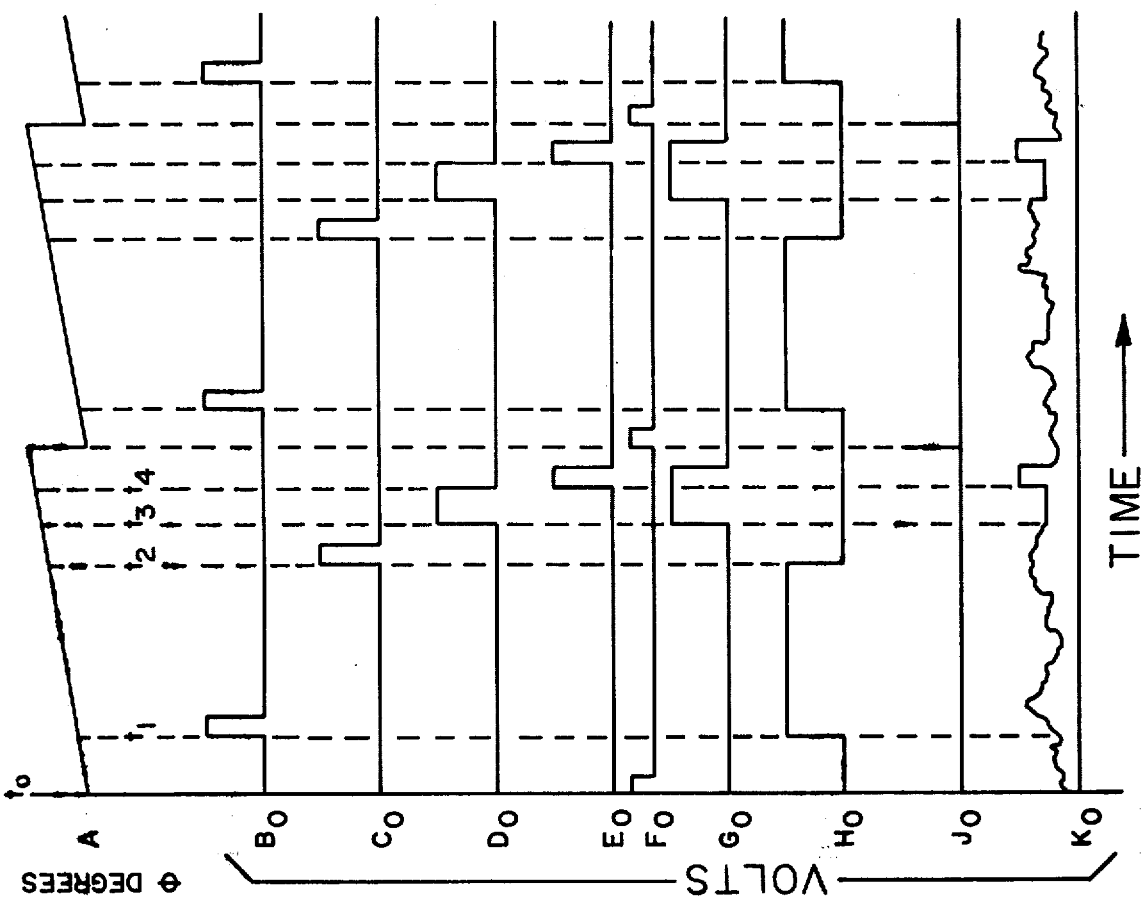
FIGS. 3A and 3B are timing diagrams of signal waveforms associated with the invention shown in FIG. 1.

Referring now to FIG. 1 in conjunction with FIGS. 3A and 3B, further operation of the invention will be explained. Waveform A provides a timing diagram for the mirror 12 as it rotates through a scanning sequence. The rotation of the mirror 12 is analogized to the sawtooth pattern in waveform A wherein each of the repetitive signals are representative of a 45° rotation of the eight-sided mirror 12. Accordingly, each sawtooth representation is indicative of the complete rotation of one side of the mirror 12 measured from some preselected point in space. Thus, time $t_o$ indicates the beginning of a line scan. At time $t_1$ the mirror 12 has so positioned itself to start the reflection of the incoming radiation λ onto the infrared detectors. At time $t_2$ the mirror 12 has ended the scan of incoming radiation and has thus scanned over the angle $\theta_A$ which obviously is less than the total single scan rotation of 45°. At times $t_3$ and $t_4$ the mirror 12 begins to respectively scan infrared reference sources 24, 26. Thus the most important portions of one complete scan by one side of the mirror 12 are the times during which the channel resolution elements $k$ are scanned, $t_1$–$t_2$, and the times during which each of the reference sources have begun to be scanned $t_3$, $t_4$. The remaining portions of the 45° scan are dead time. Coincident with the mirror 12 beginning the scan of the incoming radiation λ, photocell 30 receives a reflected light pulse from diode 28 and generates an output pulse at time $t_1$ shown in waveform B which is connected to one input of the generator 52. Similarly, photocell 32 produces an output pulse at time $t_2$, shown in waveform C, at the end of the incoming radiation scan and this pulse is provided to a second input of the generator 52. Photocell 34 notes the time $t_3$ at which the mirror 12 is scanning the first reference source 24 and produces an output pulse shown in waveform D. Photocell 36 notes the time $t_4$ at which the mirror 12 begins to scan the second reference source 26 and provides an output pulse to the generator 52 as shown in waveform E. Photocell 37 notes the time $t_o$ at which each full side of the mirror 12 makes a 45° rotation and produces an output pulse shown in waveform F to a fifth input of the generator 52. The generator 52 combines the five input signals by means of circuitry well known to those skilled in the art to produce three output signals shown as waveforms G, H, and J. Such circuitry, for example, can be comprised of single shots and appropriate gates. Waveform G provides a high active signal during the time in which the mirror 12 is viewing the reference sources 24, 26. Waveform H provides a high active signal during the time that the mirror 12 is scanning the incoming radiation λ. Waveform J provides a series of pulses indicative of the beginning of a new line scan by the mirror 12 and thus provides a vertical rate synchronizing signal to the sensor system timing and display 62. Waveform K in FIG. 3A illustrates a typical analog output on one channel produced by the infrared detector 18. During time $t_1$–$t_2$, waveform K illustrates an analog representation of the infrared radiation λ seen by the detector 18. The analog information in waveform K takes on a constant value beginning at times $t_3$ and $t_4$ which represents the constant radiation levels produced by the reference sources 24, 26. The remaining two channels of analog information produced by the detectors 20, 22 have a similar time format as to that shown in waveform K. Amplifiers 38, 40, 42 respectively receive the analog information provided by each of the detectors 18, 20, 22 and provide respective output signals which are suitably amplified to permit digital conversion. A/D converters 44, 46, 48 each have their first inputs respectively connected to receive the output signals from amplifiers 38, 40, 42. The clock 54 is connected to receive the sync pulse shown in waveform J which indicates the beginning of a new scan line, thus ultimately insuring that system timing remains synchronized and all processing and data display is performed in the proper order. The clock 54 provides an output signal having a frequency $f$ that is equal to $mnl$ pulses per second wherein $l$ is the number of complete frames per second to be shown on the display 62, $m$ is the number of samples taken by the A/D converters 44, 46, 48 of each detector channel during each frame and $n$ is the number of channels within the system. The first divider 56 receives the clock frequency $f$ and provides a divide by $n$ circuit which produces an output signal having a frequency of $ml$ pulses per second which represents the line rate for the single channel video output of the sensor system and thus is connected to the first input of the display 62 to be used as the line sync signal. It should be noted that the ratio $m/k$ determines the number of samples by the A/D converters 44, 46, 48 per detector resolution element. This ratio must be at least greater than two according to well known sampling principles if all of the frequency information of the detector signals is to be maintained. A sampling rate of three is used within the present embodiment. It should be noted that with an A/D conversion rate of three samples for resolution element, there would be required approximately 150 resolution elements per scan line for a conventional television display of 450 vertical lines per frame. The second divider 60 is connected to receive the output of the first divider 30 and further divides the incoming frequency by $m$ to produce an output signal having a frequency of $l$ pulses per second which is connected to the second input of the display 62 in order to provide the frame sync signal. If desired, the clock frequency $f$ need not be synchronized with the rotation of the mirror 12 but rather the processing system may be run asynchronously provided that the final analog video is synchronized with the mirror 12. The synchronized system is preferred because there is less chance of aliasing or beating different frequencies.

Figure 3B:
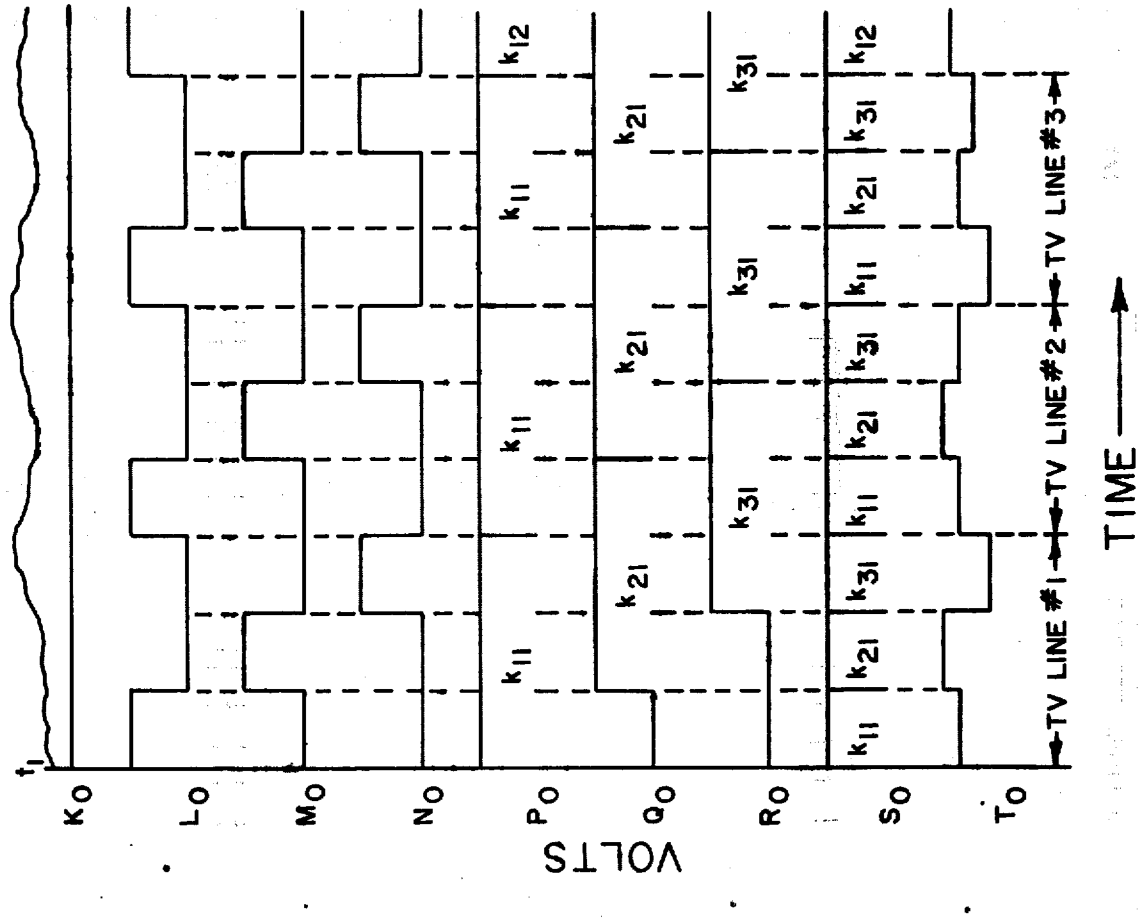

Referring now to FIG. 3B in conjunction with FIG. 1, there is shown an enlarged view of a portion of the signal shown in waveform K of FIG. 3A beginning at time $t_1$. The sample generator 58 is connected to receive the output clock frequency $f$ and provides a sequence of three output signals as shown in waveforms L, M and N. Such a generator 58 may be easily constructed by one skilled in the art, for example, from a three stage shift register that generates a recurring single bit. The outputs of the generator 58 are each respectively connected to the second inputs of each of the A/D converters 44, 46, 48 and provide sequential sampling signals to the converters. Accordingly, converter 44 receives the signal shown in waveform L and produces an eight bit digital representation of the first resolution element $k_{11}$ provided by the first channel detector 18. Waveform P illustrates the times during which the eight bit digital representation of the first channel resolution elements $k$ are present and delineates the time during which a new sampled digital value is available. All resolution elements $k$ within each channel are sampled three times. For the first channel digital output as shown in waveform P, the digital information is updated with each succeeding pulse shown in the signal of waveform L. Accordingly, waveform P illustrates three output time durations during which the first resolution element $k_{11}$ is available and a portion of a fourth time period during which the second resolution element $k_{12}$ has been sampled and digitized. Similarly, waveform M illustrates the sampling pulses which gate the converter 46 producing an output signal having a time format shown in waveform Q, and waveform N illustrates the sampling pulses which gate the converter 48 producing an output signal having a time format shown in waveform R. In the present embodiment, the A/D converters provide an eight bit capability. Obviously, if greater system resolution were desired the bit capability may easily be increased. The three channel processor 50 whose operation will later be explained, is connected to receive each of the three eight bit digital outputs from the converters 44, 46, 48 and normalizes both the gain and levels of the incoming signals on the individual channels. The sampler 64 is connected to receive the normalized eight bit digital outputs from each of the three outputs of the processor 50. Additionally, the sampler 64 receives the timing signals shown in waveforms L, M and N from the generator 58 and produces a single multiplexed digital output signal shown in waveform S which represents a continuing series of three eight-bit digital words with each word indicative of a single channel information in time sequence. The conventional sampler 64 can easily be constructed by one skilled in the art, for example, by utilizing three groups of eight AND gates wherein each group processes one channel of information which is gated by one of the three timing signals shown in waveforms L, M, N. Since the gates are activated for the duration of the timing pulses, each eight bit word indicative of a single channel occupies the time duration equal to the particular gating pulse. Accordingly, the time periods delineated in waveform S represent a repetitive digital series of eight bit words beginning with the first channel resolution element $k_{11}$ and sequencing through the channel 2 element $k_{21}$ and channel 3 element $k_{31}$, respectively. Thus the time format shown in waveform S of the output signal from the sampler 64 is now suitable for television display. A conventional single channel processor 66 is connected to receive the output signal from the sampler 64 and is provided in the present embodiment in order to perform any of the well known real time processing manipulations such as signal filtering. The output of the single channel processor 64 is connected to the D/A converter 68 which transforms the input signal into an analog form as shown waveform T which is connected to the third input of the display 62 and provides the analog video information. As noted in waveform T, one television line now comprises the analog video information produced by the three signal levels representative of the three sensor system channels. Each of the three analog levels within any television line produces an illuminated spot on the television scan, the intensity of which is proportional to the analog signal level.

Figure 4:
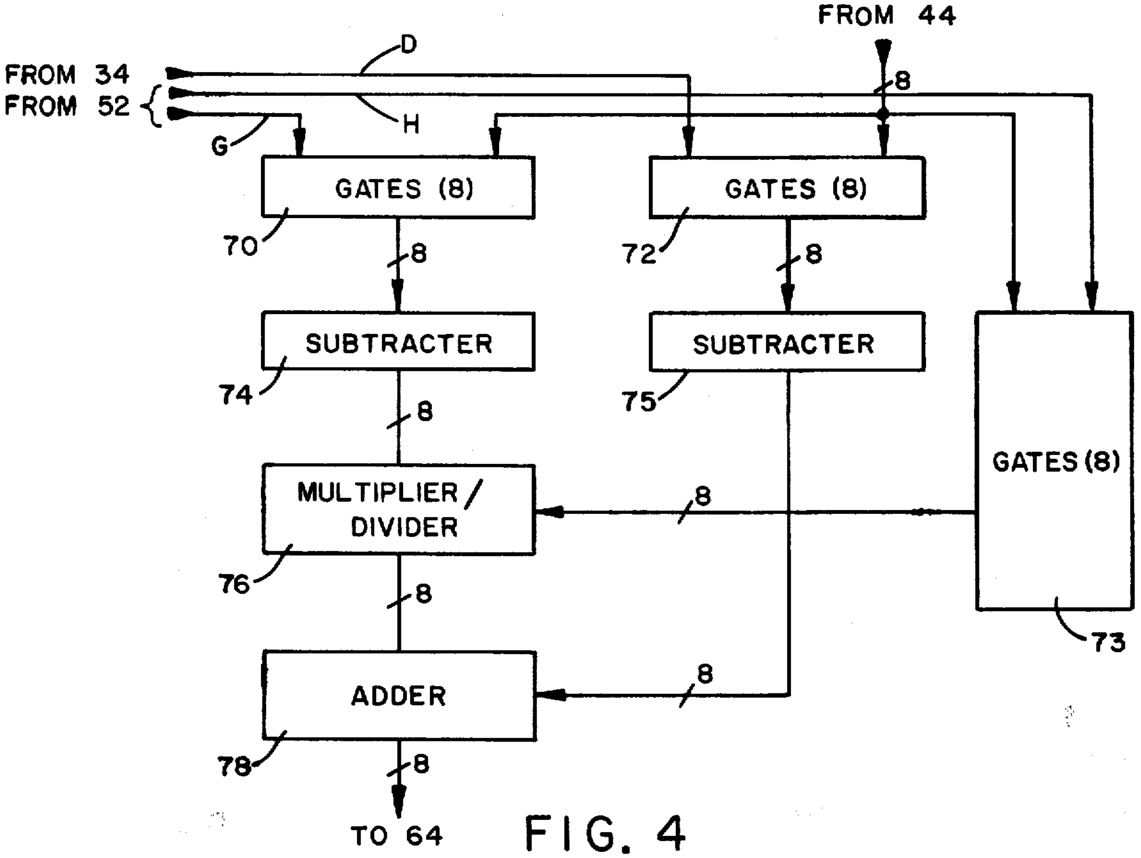
FIG. 4 is a block diagram of the circuitry used within one channel of the three channel processor of the invention shown in FIG. 1.

Referring now to FIG. 4, the normalization process applicable to one channel of information within the three channel processor 50 will now be explained. It is to be noted that the normalization process applicable to the remaining two channels of the processor 50 will be accomplished with identical circuitry and operation. Obviously, the channel capability of the processor 50 is dependent upon only the number of detector elements utilized. Each eight bit word received at the individual channel inputs of the three channel processor 50 will be separately processed with eight bit parallel circuitry. Accordingly, there are shown a first group of eight gates 70, a second group of eight gates 72 and a third group of eight gates 73 with each group having one of its inputs commonly connected to receive the eight bit output word from the first channel A/D converter 44. Gates 70 have their second input connected to receive the enabling signals shown in waveform G of FIG. 3A from one output of the sync gate generator 52. Similarly, gates 72 and 73 each have their second inputs connected to receive respectively the signals shown in waveform D and H of FIG. 3A. Thus, gates 70 are enabled during the time that the sensor system is scanning the two reference sources 24, 26, gates 72 are enabled during the time that the first reference source 24 is being scanned, and gates 73 are enabled during the time that the incoming radiation λ is being scanned. Assuming that the mirror 12 has just begun to scan the first reference source 24, the signal shown in waveforms D and G concurrently activate gates 72 and 70, respectively. Similarly gates 73 are inactivated by the signal shown in waveform H. Thus gates 70 and 72 parallely gate the incoming eight bit word to the inputs of a first subtracter 74 and a second subtracter 75, respectively. Subtracter 75 receives the eight bit word representative of the radiation level $R_1$ within the first reference source 24 from the outputs of gates 72 and subtracts from this radiation level $R_1$ a predetermined constant value $C_1$ which is permanently stored within the subtrahend register. The subtraction is performed and the remainder $K_1$, representative of a level normalization constant, is retained at the output of the subtracter 75 until a new subtraction process takes place. Concurrently, the subtracter 74 receives from gate 70 a first sampled output $R_1$ representative of the radation level within the first reference source and a second sampled output $R_2$ representative of the radiation level within the second reference source 24. Subtracter 74 subtracts $R_1$ from $R_2$ and produces a remainder output which is connected to the input of a multiplier/divider 76. The multiplier/divider 76 has permanently stored within a dividend register a second predetermined constant value $C_2$ which is divided by the output from the subtacter 74. After the scanning of the second reference source 26, gates 73 are activated by the signal shown on waveform H and gates 70 and 72 are inactivated. Accordingly, there is provided to a second input of the multiplier/divider 76 the first sampled eight bit output word representative of the radiation level of the incoming radiation λ which is then multiplied by the quotient value formerly computed to form a product output which is connected to one input of an adder 78. The remainder output $K_1$ of the subtracter 75 is connected to a second input of the adder 78 and is added to the product output value of the multiplier/divider 76. The level normalization constant $K_1$ is a signed value and the adder 78 performs an addition with a negative or positive value accordingly. The output sum of the adder 78 thus forms an eight bit digital value representative of a normalized sensor channel word. The resultant eight bit word sum at the output of the adder 78 is now corrected for any drifting of the detectors, amplifers or analog portions A/D converters. Because the same reference numbers are used for all channels, the channels are normalized to each other for both gain and level. Since the normalization process is performed every detector scanline, the channel balance will be maintained on an absolute basis as long as the references are maintained constant.

Figure 5:
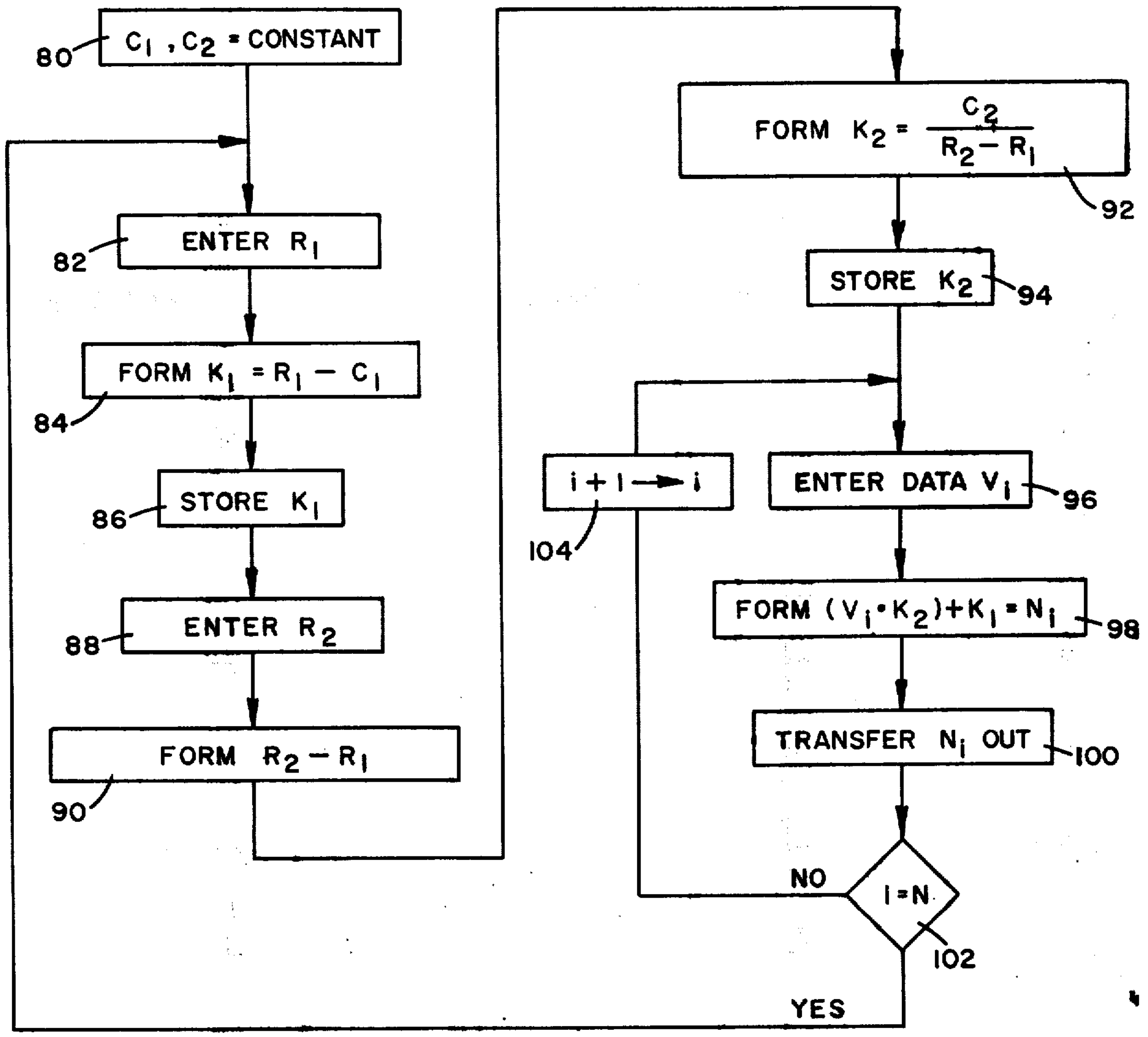
FIG. 5 is a flow chart for the operations of the three channel processor used within the invention shown in FIG. 1.

Referring now to FIG. 5 there is shown a flow chart of operations performed within the three channel processor 50 shown in FIG. 1. Beginning with the first step shown in Block 80, the reference numbers $C_1$, $C_2$ are set equal to predetermined constants. The next step shown in Block 82 requires the entry of data $R_1$ associated with the first radiation reference source. The next step of the flow diagram shown in block 84 requires the level normalization constant $K_1$ to be formed from the difference between the first reference source data $R_1$ and $C_1$. The next step shown in block 86 stores $K_1$ and the succeeding step shown in Block 88 requires that the data $R_2$ from the second reference source be entered. The next shown in Block 90 requires a difference to be calculated between the second reference source data $R_2$ and the first reference source data $R_1$. The next step shown in Block 92 requires that the gain normalization constant $K_2$ be calculated by dividing $C_2$ by the difference value obtained in the step located in Block 90. The next step as shown in Block 94 requires that the gain normalization constant $K_2$ be stored. Video data $V_i$ from the outside scene is entered into the system as shown in Block 96 beginning with the data associated with the first channel. The video data $V_i$ corresponds to the channel under process according to the values $i = 1, 2, \ldots n$ wherein $n$ is the number of complete channels. The next succeeding step shown in Block 98 requires that the normalized output $N_2$, of a particular channel be formed by multiplying the incoming video information $V_i$ on that channel times the gain constant $K_2$ and then adding the level constant $K_1$. As shown in Block 100, the next step of the flow chart requires that the calculated normalized video data $N_i$ be transferred out of the processor. The decision level shown in Block 102 asks if the channel that was previously normalized was the last channel to be processed. If no, the step in Block 104 requires that $i$ be incremented by one and that the process resume once again beginning with the step shown in Block 96. The process is repeated until $i$ equals $n$, at which time the next step from 102 is to return the process to a new starting point beginning with the step shown in Block 82.

Figure 6:
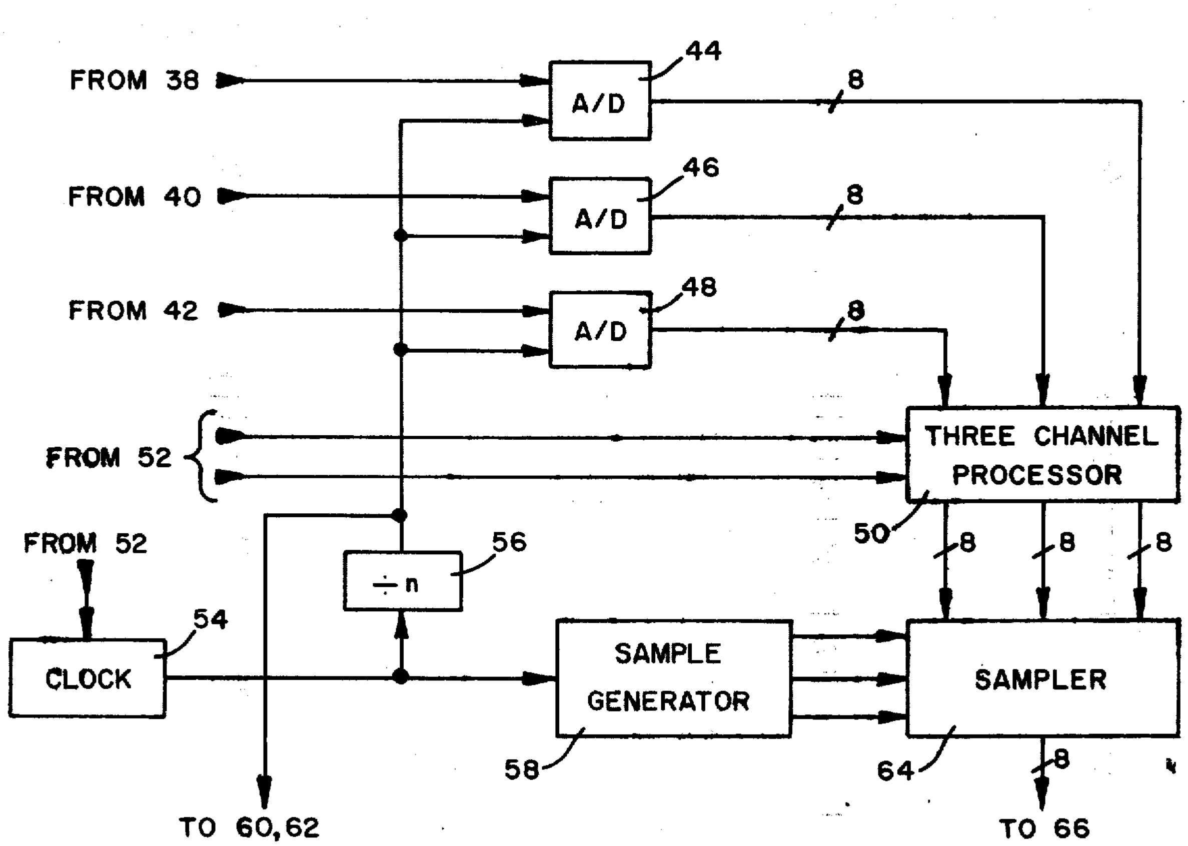
FIG. 6 is a block diagram of an alternative configuration of a portion of the present invention which provides for an enlarged bandwidth video signal.

Referring now to FIG. 6 there is shown an alternative configuration of the present invention which provides for an enlarged bandwidth video signal due to an increase in the sampling rate. It should be noted that in the configuration of FIG. 1, the sample time of the A/D converters 44, 46, 48 is initiated just after the sampler 64 has sampled a particular channel thereby giving the A/D converters up to *n* sample times to complete their conversion before they will be sampled again. In the configuration of FIG. 6, all sampling must stop while the A/D converter conversion is taking place and, therefore, all channels must be sampled before the next conversion sample is taken. Therefore, the sampling rate and, accordingly, the video bandwidth in the alternative configuration is much greater than in the structure of FIG. 1. However, the tradeoff paid for the lower sampling rate in FIG. 1 is a slight slewing of the lines at the single channel video output. That is, the lines produced by the single channel output are no longer exactly perpendicular to the detector scan lines and the sequencing of operations in the three channel processor 50 will be staggered for each channel processed. It should be noted, however, that if the system is producing three samples per resolution element *k*, the slewing will only effect one third of a resolution element.

Thus, there may be seen that there has been provided a multi-channel infrared sensor system having digital normalization of the gains and levels of the individual channels and which produces an analog video output which is television compatible without requiring the use of scanning converters or storage.

Obviously, many modifications and variations of the invention are possible in light of the above teachings. For example, the present invention may be used with other multi-channel devices such as acoustical systems, seismic systems, meteorological data systems and medical systems. It is therefore to be understood that within the scope of the appended claims the invention may be practiced otherwise than as specifically described.

What is claimed is:

1. A plural channel infrared sensor system for directly interfacing with a television display comprising, in combination:

scanning means for sequentially scanning an external source of an unknown level of radiation, first and second internal sources of known levels of radiation, within predetermined sectors of a complete scan, and providing a scanning output;

detection means optically connected to receive the scanning output and having a plurality of detector elements positioned transverse to the direction of scanning for providing analog outputs indicative of the radiation;

position indicating means operatively connected to said scanning means for providing a first output during the external source scan, a second output during the internal sources scans, a plurality of third outputs of a series of pulses indicative of corresponding segments within the sectors, the pulses in each of said series being sequential with the pulses of the other series and the plurality being equal to the number of said detector elements, fourth and fifth outputs each synchronous with the plurality of said third outputs for respectively providing line and frame synchronization pulses for the television display, and a sixth output during the first internal source scan;

first conversion means connected to receive the analog outputs and the position indicating means third outputs for sampling and converting the analog outputs and producing digital outputs representative of the sampled analog outputs;

processing means having a plurality of channels for normalizing the gains and levels of each of the digital outputs to one another, each channel including first normalizing means connected to receive the first and second position indicating means outputs and a respective one of said first conversion means outputs for producing a gain normalized output, and second normalizing means connected to receive the sixth position indicating means output, the respective one of said first conversion means outputs, and said first normalizing means output for producing a gain and level normalized digital output;

multiplexing means receiving the position indicating means third outputs and the processing means digital outputs for multiplexing said processing means outputs into a digital output having a single channel representative of said processing means digital outputs; and second conversion means operatively connected to receive said multiplexing means digital output for converting said multiplexing means output to an analog video output for the television display.

2. A plural channel infrared sensor system according to claim 1 further comprising:

a single channel processor receiving said multiplexing means output for providing real time signal processing of said multiplexing means output and producing an output representative thereof.

3. A plural channel infrared sensor system according to claim 1 wherein said detection means detector elements form a linear array.

4. A plural channel infrared sensor system according to claim 1 wherein said first normalizing means further comprises:

gating means connected to receive the respective one of said first conversion means outputs and said position indicating means first output for producing a gated output representative of the external source radiation;

first arithmetic means connected to receive the respective one of said first conversion means outputs and said position indicating means second output for producing an output representative of the radiation difference between said internal sources; and a multiplier/divider connected to receive said first arithmetic means output and said gating means output for multiplying said gating means output by a first predetermined number and dividing the product thereof by said first arithmetic means output for producing said gain normalized output.

5. A plural channel infrared sensor system according to claim 4 wherein said second normalizing means further comprises:

second arithmetic means connected to receive the respective one of said first conversion means outputs and said position indicating means sixth output for producing an output representative of the difference between said sixth output and a second predetermined number; and an adder connected to receive said first normalizing means output and said second arithmetic means output for producing said gain and level normalized digital output.

6. A plural channel infrared sensor system according to claim 5 wherein said scanning means further comprises:

reflecting means optically connected to receive the external and internal radiation sources from one of a plurality of reflective surfaces and for providing the scanning output; and rotating means rotatably connected to said reflecting means for rotating said reflective surface transverse to said detector means.

7. A plural channel infrared sensor system according to claim 6 wherein said position indicating means further comprises:

light generating means for producing a constant light energy output directed at another of said reflecting means reflective surfaces;

light receiving means optically connected to receive the light energy output reflected from said other reflective surface and for providing outputs indicative of the beginning and end of the external source scan, the duration of the first and second internal sources scans and the beginning of a complete scan; and pulse generating means receiving said light receiving means outputs for producing said position indicating means outputs.

8. A plural channel infrared sensor system according to claim 7 wherein said light generating means is a light emitting diode.

9. A plural channel infrared sensor system according to claim 7 wherein said light receiving means are photocells.

10. A plural channel infrared sensor system according to claim 7 wherein said multiplexing means includes a plurality of gates wherein each of said gates is sequentially activated upon receipt of said position indicating means third outputs.

* * * * *